(12) United States Patent
Fuchs et al.

(10) Patent No.: US 12,577,372 B2
(45) Date of Patent: *Mar. 17, 2026

(54) AERATED POLYPROPYLENE COMPOSITIONS EXHIBITING SPECIFIC EMISSION

(71) Applicant: BOREALIS AG, Vienna (AT)

(72) Inventors: Andreas Fuchs, Linz (AT); Luca Boragno, Linz (AT); Girish Suresh Galgali, Linz (AT); Markus Gahleitner, Linz (AT); Jurgen Huber, Linz (AT); Stefanie Engleder, Linz (AT)

(73) Assignee: BOREALIS AG, Vienna (AT)

( * ) Notice: Subject to any disclaimer, the term of this patent is extended or adjusted under 35 U.S.C. 154(b) by 285 days.

This patent is subject to a terminal disclaimer.

(21) Appl. No.: 18/231,814

(22) Filed: Aug. 9, 2023

(65) Prior Publication Data

US 2024/0043657 A1 Feb. 8, 2024

Related U.S. Application Data

(63) Continuation of application No. 17/289,655, filed as application No. PCT/EP2019/078707 on Oct. 22, 2019, now abandoned.

(30) Foreign Application Priority Data

Oct. 31, 2018 (EP) ..................................... 18203768

(51) Int. Cl.
*C08K 5/20* (2006.01)
*C08K 3/34* (2006.01)
(Continued)

(52) U.S. Cl.
CPC .................. *C08K 5/20* (2013.01); *C08K 3/34* (2013.01); *C08K 3/40* (2013.01); *C08L 23/12* (2013.01); *C08L 2205/025* (2013.01)

(58) Field of Classification Search
CPC .... C08K 5/20; C08K 3/34; C08K 3/30; C08L 23/12
See application file for complete search history.

(56) References Cited

U.S. PATENT DOCUMENTS

| | | | |
|---|---|---|---|
| 6,218,504 B1 | 4/2001 | Dolle et al. | |
| 12,281,218 B2 * | 4/2025 | Galgali | ................... C08L 23/12 |

(Continued)

FOREIGN PATENT DOCUMENTS

| | | |
|---|---|---|
| CN | 104870486 A | 8/2015 |
| CN | 106133003 A | 11/2016 |

(Continued)

OTHER PUBLICATIONS

Applicant: Borealis AG, AT; Russian Application No. 2021114882/04(031534); Request of the Substantive Examination; Dec. 23, 2021; 20 pgs.

(Continued)

*Primary Examiner* — John E Uselding
(74) *Attorney, Agent, or Firm* — Tarolli, Sundheim, Covell & Tummino LLP

(57) ABSTRACT

A process for preparing a polypropylene composition including oligomers having a semi-volatile organic condensable (FOG, VDA 278 October 2011), content of 50 ug/g to about 400 yg/g of the total polypropylene composition, and volatile organic compounds (VOC, VDA 278 October 2011) in an amount of less than 80 ug/g of the total polypropylene composition, wherein the weight ratio of the oligomers versus the volatiles is more than about 5.0, wherein the polypropylene composition has an MFRz2 (ISO 1133, 230°

(Continued)

C., 2.16 kg) of 10 g/10 min or higher, wherein the polypropylene composition has a flexural modulus (ISO 178 on injection moulded specimens of 80×10×4 mm prepared in accordance with ISO 294-1:1996) of from 1000 to 2000 MPa, and wherein the total quantity of slip agent is at least 500 ppm.

11 Claims, 1 Drawing Sheet

(51) Int. Cl.
    *C08K 3/40*         (2006.01)
    *C08L 23/12*      (2006.01)

(56) References Cited

U.S. PATENT DOCUMENTS

| | | |
|---|---|---|
| 2006/0217528 A1 | 9/2006 | Cousin et al. |
| 2017/0121432 A1 | 5/2017 | Salek et al. |
| 2017/0313866 A1 | 11/2017 | Wang et al. |
| 2018/0200921 A1* | 7/2018 | Grein ...................... B29B 9/12 |

FOREIGN PATENT DOCUMENTS

| | | |
|---|---|---|
| EP | 0887379 B1 | 12/1998 |
| EP | 2154190 A1 | 2/2010 |
| EP | 2262858 B1 | 2/2013 |
| EP | 3126408 B1 | 10/2017 |
| GB | 1272778 A | 5/1972 |
| RU | 2506288 C2 | 2/2014 |
| RU | 2635565 C2 | 11/2017 |
| WO | 1992/012182 A1 | 7/1992 |
| WO | 99/24478 A1 | 5/1999 |
| WO | 99/24479 A1 | 5/1999 |
| WO | 2000/068315 A1 | 11/2000 |
| WO | 2002/088194 A1 | 11/2002 |
| WO | 2004/000899 A1 | 12/2003 |
| WO | 2004/039848 A1 | 5/2004 |
| WO | 2004/111095 A1 | 12/2004 |
| WO | 2014/090856 A1 | 6/2014 |
| WO | 2017/079246 A1 | 5/2017 |
| WO | 2018114984 A1 | 6/2018 |

OTHER PUBLICATIONS

Applicant: Borealis AG; "Aerated Polypropylene Compositions Exhibiting Specific Emission Profiles"; European Patent Application No. EP18203768; Extended European Search Report; Mar. 28, 2019; 7 pgs.

Applicant: Borealis AG, AT; Russian Application No. 2021114882/04(031534); Request of the Substantive Examination; May 20, 2022; 10 pgs.

Applicant: Borealis AG; Chinese Application No. 201980071549.0; Chinese Office Action; Jul. 4, 2022; 12 pgs.

Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28,1128-1137.

Cheng, et al., "13C NMR Analysis of Ethylene-Propylene Rubbers", Macromolecules 17, 1984, 1950-1955.

Kakugo, Masahiro, et al., "13C Nmr Determination of Monomer Sequence Distribution in Ethylene-Propylene Copolymers Prepared with d-TiC13-Al(C2H5)2 Cl" Macromolecules 1982, 15, 1150-1152.

Resconi, Luigi, et al., "Selectivity in Propane Polymerization With Metallocene Catalysts", Chem. Rev. 2000, 100, 1253-1345.

Singh, Gurmeet, et al., "Triad Sequence Determination of Ethylene-Propylene Copolymers—Application of Quantitative 13C NMR", Polymer Testing 28 (2009) 475-479.

Wang, Wen-Jun, et al., "Structural Analysis of Ethylene/Propylene Copolymers Synthesized With a Constrained Geometry Catalyst", Macromolecules 2000, 33, 1157-1162.

Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.

* cited by examiner

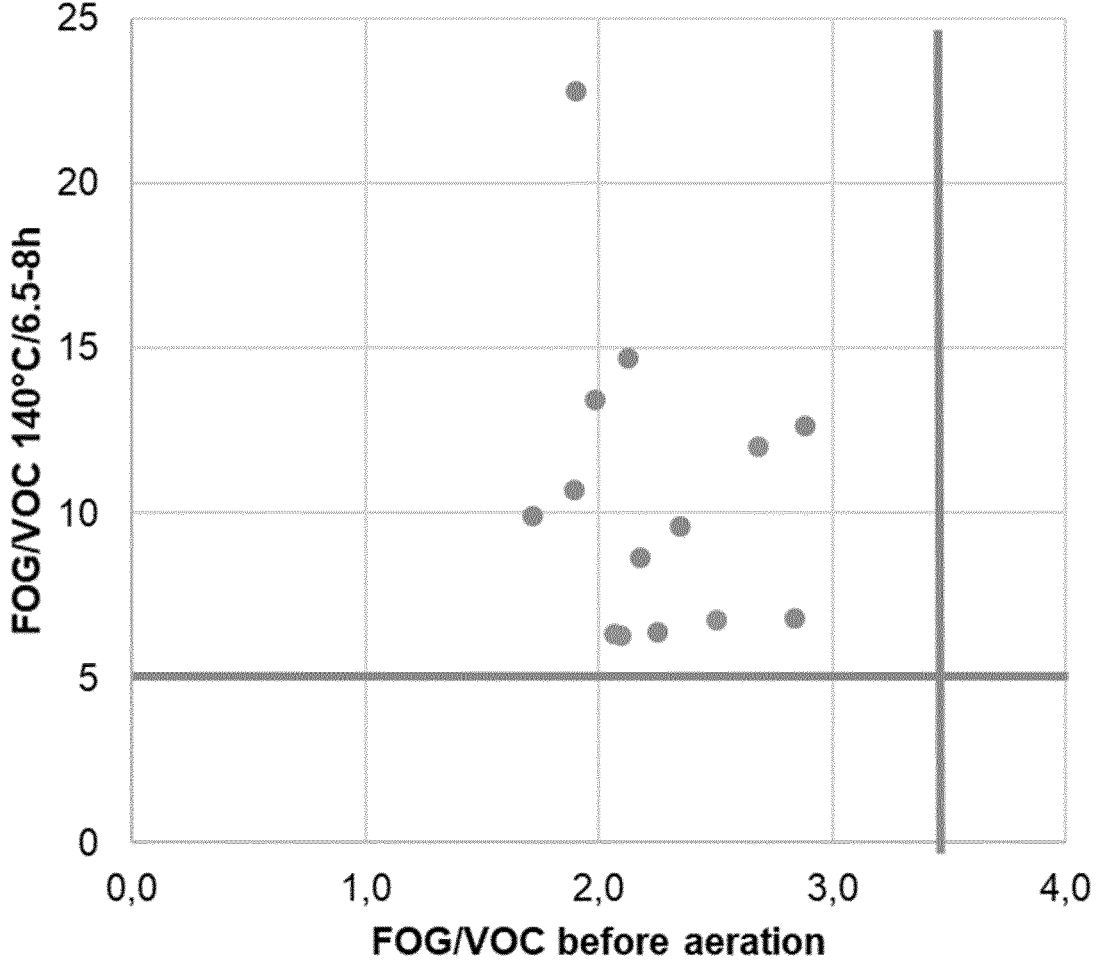

1

AERATED POLYPROPYLENE COMPOSITIONS EXHIBITING SPECIFIC EMISSION

FIELD OF INVENTION

The present invention relates to polypropylene compositions with low volatile organic compound (VOC, VDA 278 October 2011, Verband der Automobilindustrie) and semi volatile organic condensable (FOG, VDA 278 October 2011) contents. The compositions can be used in injection moulding to produce moulded products for use in automobile applications.

BACKGROUND OF INVENTION

Polyolefin polymers resulting from solution polymerisation often contain traces of the reaction medium in which the polymerisation reaction was carried out. Various options for the removal of volatile (VOC, VDA 278 October 2011) and semi-volatile organic condensables (FOG, VDA 278 October 2011) from polyolefin polymers are known. These include: the use of solvents such as water, the use of vapour, and the use of elevated temperature streams of gas in a process referred to as aeration or purging. Examples of general methods of aeration can be found in GB 1272778, WO 02/088194, WO2004/039848 and U.S. Pat. No. 6,218, 504. These documents particularly relate to aeration or purging of polyethylene compositions.

Materials used in the automobile industry for interior application have to fulfil a certain specification, particularly with regards to emission and fogging; which generally result from VOCs (VOC, VDA 278 October 2011) and FOGs (FOG, VDA 278 October 2011). This is necessary on the one hand to protect passengers from unpleasant odours and sometimes even toxic volatile substances, while on the other hand, avoiding condensation of medium molecular weight oligomers on the windscreen. Typical interior formulations are based on heterophasic copolymers combined with fillers and additives, such as e.g. slip agents, which are added in order to achieve further advantageous mechanical properties including scratch and UV resistance, as well as producing materials which are suitable for injection moulding and which can be easily removed from the mould after the injection moulding process.

In order to obtain polypropylene compounds with a particular emissions profile, it is often necessary to use a post polymerisation treatment process e.g. aeration. The development of aeration processes is challenging as polyolefin polymers have an intrinsic stickiness and a tendency to agglomerate above a relatively low temperature. This results in a limited temperature window in which aeration can be carried out. Polyolefin polymers obtained from solution polymerisation processes often have a high content of volatiles (VOC, VDA 278 October 2011). In situations where it is also important to remove semi-volatile organic compounds (FOGs, VDA 278 October 2011), often longer aeration times are required, as these molecules are by definition less volatile and harder to remove. However, in order to ensure that the polyolefin composition retains its desirable properties such as e.g. mechanical properties and scratch resistance it is important not to remove or strip out the additives required for producing a material with these properties.

Polyolefin compositions, such as e.g. polypropylene compositions exhibiting a low level of emissions in standard tests like VDA 277 and VDA 278 can be roughly separated into two categories:

polyolefins deriving their low emission level from the polymerisation process, mostly from the nature of the catalyst, but also from the purity of the applied monomers and possibly from the selection of additives.

polyolefins and polyolefin compositions having undergone a post-purification step during or after compounding, possibly involving the use of specific substances like carrier liquids or absorbers.

As discussed in WO 2017/079246 for automotive applications, industry favours the reduction of vehicle weight by reducing the mass of plastic vehicle components. The reduction in the mass of plastic vehicle components is generally achieved by decreasing the wall thickness of the plastic parts. The production of thin-walled plastic parts, using for example injection moulding, requires that the constituent polymer resins have sufficiently low viscosity so that the molten resins can readily flow and uniformly fill mould cavities without excessive injection pressures. Decreasing the melt viscosity of a polymer resin requires decreasing the molecular weight of the constituent polymer molecules forming the resin. However, producing polymer resins containing lower molecular weight molecules increases the volatile organic compound (VOC, VDA 278 October 2011) and semi-volatile organic condensables (FOG, VDA 278 October 2011) content in the resin.

EP 2154190 notes that polypropylene is the material of choice for many applications. For instance, polypropylene materials are increasingly used for applications in automotive interiors, particularly because of their good processability and the fact that they can be individually customised. It is a requirement that these materials have low levels of odour particularly when used in HVAC (heating, venting, and air-conditioning) applications and in addition, low levels of volatiles, so that they do not cause fogging on the windscreen. This document concerns the use of 1,3,5-triazine derivative stabilizers for polypropylene compositions, which lead to reduced levels of FOG and VOC content values. Such stabilizers are of course not desirable from the perspective of recycling.

WO 2017/079246 describes polypropylene based resins characterized by a VOC content of less than 125 ppm and FOG content of no greater than 500 ppm, being achieved for an in-reaction polypropylene-based polymer resin without post polymerisation treatment of the resin. The examples in this document do not show particularly significant reduction in FOGs.

EP 3260489 describes a polypropylene composition comprising (A) 60 to 95 wt-% of a heterophasic polypropylene (HECO) comprising 10 to 30 wt-% of a dispersed phase, with the dispersed phase having a co-monomer content of 30 to 45 wt-% and the HECO having a melt flow rate in the range of 12 to 200 g/10 min. Wherein, the polypropylene compounds have very low fogging gravimetrics. However, again this document does not relate to aeration treated compounds. The VOC values obtained for the inventive examples are additionally all above 80 μg/g.

EP 2262858 describes polypropylene polymer compositions characterised by low emissions, high toughness and good scratch resistance. Exemplary levels of volatiles of less than 45 μgC/g (measured according to VDA 277) and an amount of VOCs (according to VDA 278 October 2011) of less than 100 μg/hexadecane equivalents are given. These low levels of volatiles are achieved through the polymerisation process detailed in this document. However, this document specifically doesn't focus on compositions obtained from aeration processes.

WO 2014/090856 specifically refers to the degassing of polyolefin particles in powder form with a stream of nitrogen, followed by pelletisation of the particles. However, this document does not mention any information about VOC values (i.e. VOC content values) (VDA 278 October 2011) or FOG values (i.e. FOG content values) (VDA 278 October 2011) of the product produced.

EP 3 126 408 relates to methods for the manufacture of polypropylene materials having target melt flow rates of from 10 to 200 g/min and of reducing FOG values to preferably about 250 µg/g or lower by maintaining the polymer composition at an elevated temperature for a sufficient period of time. This document merely speculates about using a gas stream for removing volatiles, but does not discuss aeration processes in the examples section. In addition, this document does not focus on reducing the VOCs in the polypropylene compositions.

Consequently, none of the documents above particularly relate to compositions with low levels of VOCs (VDA 278 October 2011) usually below about 60 µg/g, low levels of FOCs (VDA 278 October 2011) usually below about 350 µg/g, wherein the composition contains a relatively high level of slip agent such as e.g. erucamide. The present invention in addition particularly relates to composition resulting from aeration treatment. Preferably, wherein these composition contain a high level of "slip agent" such as erucramide, and wherein the process in general is an integrated process, wherein no further slip agent is added to the polypropylene composition after the polypropylene material has been aerated. Low levels of both VOCs and FOGs are required for articles, which are used in automobile applications, as it is important to protect passengers on the one hand from unpleasant or even toxic volatile substances (VOC fraction) and, on the other hand, from condensation of medium molecular weight oligomers or additives on the windscreen (FOG fraction).

Therefore, there is interest from the automobile industry in developing materials with a particular emission profile, with low levels of VOCs and FOGs. Obtaining such materials using aeration processes is particularly desirable as aeration processes are post polymerisation processes, which can be used to treat a range of polymers after polymerisation.

SUMMARY OF THE INVENTION

The present invention insofar provides
a propylene composition comprising
semi-volatile organic condensable oligomers (FOG, VDA 278 October 2011) in an amount of 50 µg/g to about 400 µg/g of the total polypropylene composition, and volatile organic compounds (VOC, VDA 278 October 2011) in an amount of less than 80 µg/g of the total polypropylene composition,
wherein the weight ratio of said semi-volatile organic condensable oligomers versus said volatile organic compounds is more than about 5.0,
wherein the polypropylene composition has an $MFR_2$ (ISO 1133, 230° C., 2.16 kg) of 10 g/10 min or higher,
wherein the polypropylene composition a flexural modulus (ISO 178 on injection moulded specimens of 80×10×4 mm prepared in accordance with ISO 294-1: 1996) of from 1000 to 6000 MPa, and
wherein the total quantity of slip agent is at least 500 ppm.

The term "composition" may refer to both homopolymers or copolymers, which may optionally contain further components and/or additives.

The term "volatile organic compound content" or "VOC content" refers to the toluene equivalent content in a sample of material determined according to the Verband der Automobilindustrie recommendation VDA 278 October 2011. Volatile organic compound content is a measure of emissions from plastic materials such as low-density plastomers, which are caused by low-molecular components in the polymer material, generally alkanes with carbon chain lengths of up to $C_{20}$. These low molecular components can be residual monomers, oligomers, additives, plasticizers and/or degradation products.

The term semi-volatile organic condensables content (FOG, VDA 278 October 2011) refers to the n-hexadecane equivalent content in a sample of material determined according to the Verband der Automobilindustrie recommendation VDA-278 October 2011. Semi-volatile organic compound content is a measure of emissions from plastic materials, which are caused by medium molecular weight components, such as oligomers, which have a boiling point in the range of $C_{14}$-$C_{32}$ alkanes.

The term aeration or aeration process as used herein denotes a process or process step, in which a compound is subjected to a gas flow. This process is carried out in an aeration vessel.

The term aeration gas such as used herein denotes any gas suitable for being heated up to at least 50° C. and suitable for removing volatile organic compounds (VOCs) and semi-volatile organic condensables (FOGs) from polyolefin compositions. Suitable gases are, for example, nitrogen, or air, or mixtures thereof. However, in principle any inert gas may be used. For economic reasons, the most preferred gas for the process of the present invention is air.

According to the current invention the Reynolds number for fluid (gas) flow through a packed bed, of the particles with a diameter D (m) in contact, where the superficial velocity is $v_s$, (m/s) is defined as:

$$Re = (\rho v_s D)/\beta$$

where:
ρ: density of the aeration gas at the temperature used $(kg/m^3)$
µ: kinematic viscosity of the aeration gas at the temperature used (kg/m s)
$v_s$: superficial velocity, defined as Q/A where Q is the volume flow rate of the aeration gas, $(m^3/s)$ and A is the cross sectional area $(m^2)$ As a matter of definition the diameter D (m) shall be the median particle diameter d50 (in meter) as obtained from a sieve analysis according to ISO3310 and determination of d50 according to ISO 9276-2.

Laminar conditions apply up to Re=10, fully turbulent from Re=2000.

The Reynolds number (Re) is an important dimensionless quantity in fluid mechanics used to help predict flow patterns in different fluid flow situations.

It is used in the scaling of similar but different-sized flow situations, such as between an aircraft model in a wind tunnel and the full size version. The predictions of the onset of turbulence and the ability to calculate scaling effects can be used to help predict fluid behaviour on a larger scale. In other words, the Reynolds number can be used to ensure that similar flow conditions are maintained when changing the scale (size) of the equipment where flow is taking place.

The term "polypropylene composition weight flow" as used herein denotes the total weight of polypropylene composition flowing into the aeration vessel per hour.

The term "pellets" as used herein denotes a polyolefin composition in the form of pellets and/or granulated material. Usually the pellets or granulated material will result from pelletizing or granulation. For example, pellets can be formed by forcing the polyolefin composition melt through a die and pelletizing it subsequently with an underwater granulator. Pellets according to this invention may be oblong shaped, wherein the length of the pellet is greater than the width and height of the pellet.

"Fatty acid amides" is used to refer to amides formed from a fatty acid and an amine, these compounds are also known as N-acylethanolamines, and they contain the functionality $RC(O)N(H)CH_2CH_2OH$.

The term "random" indicates that the co-monomers of the propylene copolymer are randomly distributed within the propylene copolymers. The term random is understood according to IUPAC (Glossary of basic terms in polymer science; IUPAC recommendations 1996).

There are two types of heterophasic propylene copolymers:

HECOs, which are heterophasic copolymers which have a polypropylene homopolymer as the matrix phase. These materials are used for a wide variety of applications including in household applications and in car bumpers, due to their good mechanical properties, especially their impact strength.

RAHECOs, which are heterophasic copolymers comprising a polypropylene random copolymer as the matrix phase, these materials are often used for soft fibres and films.

The present invention preferably provides a polypropylene composition, obtainable by blending polypropylene
filler
slip agent
optional HDPE
optional plastomer
optional pigment
in the presence of additives to obtain a blend,
and further subjecting the blend to a process comprising the steps of
a) providing an aeration vessel having
at least one inlet for aeration gas,
at least one outlet for exhaust gas,
an inlet for a raw polypropylene composition at the top of the aeration vessel,
an outlet for the polypropylene composition at the bottom of the aeration vessel,
wherein the polypropylene composition is present as a packed bed.
b) initiating a counter-current flow of the polypropylene composition and aeration gas
c) by
feeding the raw polypropylene composition having a volatile organic compound content (VOC, VDA 278 October 2011) of greater than about 150 µg/g and a semi-volatile organic condensable content of greater than about 350 µg/g (FOG, VDA 278 October 2011), into said aeration vessel from the top,
feeding the aeration gas into said aeration vessel via the at least one inlet at the bottom;
withdrawing the exhaust gas via the outlet for exhaust gas;

withdrawing the aerated polypropylene composition via the outlet at the bottom of the aeration vessel
d) maintaining said aeration gas flow for an aeration time of from 3 to 96 hours, wherein, the temperature of the gas is from 100° C. to 140° C., and wherein, the Reynolds number of the gas flow is from 5 to 150.

In a preferred aspect of the present invention, wherein the blending step involves blending a heterophasic polypropylene with a further polypropylene homo- and/or copolymer.

In a preferred aspect of the present invention, the polypropylene composition comprises at least 500 ppm slip agent, wherein the slip agent is a fatty acid amide. The fatty acid amide is preferably erucamide or oleamide and most preferably erucamide.

The polypropylene composition according to the present invention preferably has a VDA 277 of less than 3 and of preferably less than 1.

In a preferred aspect of the present invention, the polypropylene composition has a fogging gravimetric of less than 1.1, preferably less than 1 and/or a VDA 270 of 4 or less, preferably 3 or less.

The polypropylene composition according to the present invention preferably has an $MFR_2$ (ISO 1133, 230° C., 2.16 kg) of from 5 to 160 g/10 min, preferably from 8 to 50 g/10 min, most preferably from 10 to 130 g/10 min.

In a preferred aspect of the present invention, the polypropylene composition has a flexural modulus (ISO 178 on injection molded specimens of 80×10×4 mm prepared in accordance with ISO 294-1:1996) of from 1000 to 6000 MPa, preferably from 1200 to 5500 MPa, more preferably from 1300 to 5000 MPa.

The polypropylene composition according to the present invention preferably has a puncture energy (ISO 6603-2) of from 3 to 60 J, preferably from 4 to 50 J, most preferably from 5 to 45 J.

In a preferred aspect of the present invention, the polypropylene composition has a melting point of from 155° C. to 170° C., such as in the range of 160° C. to 167° C.

In a preferred aspect of the present invention, the raw heterophasic polypropylene component added into the blend prior to the aeration step is a heterophasic propylene copolymer (HECO). Said heterophasic propylene copolymer (HECO) preferably has an $MFR_2$ (ISO 1133, 230° C., 2.16 kg) of from 5 to 150 g/10 min, preferably from 10 to 120 g/10 min. Moreover, said heterophasic propylene copolymer (HECO) preferably has a xylene solubles content (ISO 6427 at 23° C.) of from 8 to 30 wt-%, preferably from 10 to 25 wt-%. In addition, said heterophasic propylene copolymer (HECO) preferably has a total content of units derived from ethylene of from 4 to 20 wt.-%, preferably from 6 to 15 wt.-% (as determined by NMR).

In a preferred aspect of the present invention, the raw further polypropylene homo- or copolymer component added to the blend prior to the aeration step is a polypropylene homopolymer. Optionally, the homopolymer has an $MFR_2$ (ISO 1133, 230° C., 2.16 kg) of from 20 to 160 g/10 min, preferably from 50 to 100 g/10 min, most preferably from 60 to 80 g/10 min, such as around 75 g/10 min. Alternatively, said further polypropylene homo- or copolymer component added into the blend prior to the aeration step may be a polypropylene copolymer. Said raw polypropylene copolymer preferably has a $MFR_2$ (ISO 1133, 2.16 kg, 230° C.) of 5 to 120 g/10 min and/or a xylene soluble (ISO 16152) content of 8 to 20 wt.-% and/or a total content of units derived from ethylene in an amount of 4 to 10 wt.-% (determined by NMR).

The polypropylene composition according to the present invention preferably contains a filler, wherein the filler can be selected from the group consisting of talc, glass, and mixtures thereof.

In a preferred aspect of the present invention, the polypropylene composition contains a plastomer, preferably an ethylene-octene plastomer.

In a preferred aspect, the polypropylene composition according to the present invention contains a pigment, preferably a black pigment, such as e.g. a carbon black pigment.

The polypropylene composition according to the present invention is preferably produced in an integrated process, wherein no further slip agent is added to the composition after the aeration step.

DETAILED DESCRIPTION

It has surprisingly been found that the aeration treated polypropylene compositions of the current invention, display acceptable levels of both VOCs and FOGs and contain greater than 500 ppm of slip agent, this is advantageous as it means that the polypropylene compositions are easily released from the mould after injection moulding processes. Furthermore, the presence of slip agents such as erucamide leads to enhanced scratch resistance properties of the polypropylene compositions. It is important that slip agents are added to the composition prior to the aeration process as this leads to a desirable and even distribution of the slip agent throughout the polypropylene composition, whereas a less even distribution of slip agent is seen in compositions in which the erucamide is added after the aeration step.

In a first preferred embodiment of the present invention, the polypropylene composition contains greater than 500 ppm of the slip agent erucamide. This embodiment aims at a polypropylene composition, which is particularly suitable for injection moulding, as the presence of erucamide ensures that the polypropylene composition does not stick to the walls of the mould. This means that a moulded product can be easily removed from a mould and doesn't leave any residue behind, which is important in the moulding process.

Insofar, the first preferred embodiment of the invention relates to a polypropylene composition comprising:
oligomers having a semi-volatile organic condensable (FOG, VDA 278 October 2011), content of 50 µg/g to about 400 µg/g of the total polypropylene composition, and
volatile organic compounds (VOC, VDA 278 October 2011) in an amount of less than 80 µg/g of the total polypropylene composition,
wherein the weight ratio of said semi-volatile organic condensables versus said volatiles is more than about 5.0,
wherein the polypropylene composition has an $MFR_2$ (ISO 1133, 230° C., 2.16 kg) of 5 g/10 min or higher,
wherein the polypropylene composition has a flexural modulus (ISO 178 measured on injection moulded specimens of 80×10×4 mm prepared in accordance with ISO 294-1:1996) of from 1000 to 6000 MPa, and
wherein the total quantity of erucramide slip agent is at least 500 ppm, wherein the polypropylene composition is obtainable by blending:
a heterophasic polyproyplene
a further polypropylene homo- or copolymer
filler
slip agent
optional HDPE optional plastomer
optional pigment
in the presence of additives to obtain a blend,
and further subjecting the blend to a process comprising the steps of
a) providing an aeration vessel having
at least one inlet for aeration gas,
at least one outlet for exhaust gas,
an inlet for a raw polypropylene composition at the top of the aeration vessel,
an outlet for the polypropylene composition at the bottom of the aeration vessel,
wherein the polypropylene composition is present as a packed bed.
b) initiating a counter-current flow of the polypropylene composition and aeration gas
c) by
feeding the raw polypropylene composition having a volatile organic compound content (VOC, VDA 278 October 2011) of greater than about 150 µg/g and a semi-volatile organic condensable content of greater than about 350 µg/g (FOG, VDA 278 October 2011), into said aeration vessel from the top,
feeding the aeration gas into said aeration vessel via the at least one inlet at the bottom;
withdrawing the exhaust gas via the outlet for exhaust gas;
withdrawing the aerated polypropylene composition via the outlet at the bottom of the aeration vessel,
d) maintaining said aeration gas flow for an aeration time of from 3 to 96 hours, wherein, the temperature of the gas is from 100° C. to 140° C., and wherein, the Reynolds number of the gas flow is from 5 to 150.

In a second preferred embodiment, the polypropylene composition has a high flexural modulus (ISO 178 measured on injection molded specimens of 80×10×4 mm prepared in accordance with ISO 294-1:1996) of from 1200 to 5500 MPa, a high puncture energy of greater than 4 J and an $MFR_2$ (ISO 1133, 230° C., 2.16 kg) of 8 g/10 min or higher. This embodiment aims at a polypropylene composition, which is relatively stiff and resistant to bending, able to withstand a point impact and which is suitable for injection moulding applications. Such a material could, for example, be used in applications in automobile interiors.

Insofar, the second preferred embodiment of the invention relates to a polypropylene composition comprising:
oligomers having a semi-volatile organic condensable (FOG, VDA 278 October 2011), content of 50 µg/g to about 400 µg/g of the total polypropylene composition, and
volatile organic compounds (VOC, VDA 278 October 2011) in an amount of less than 80 µg/g of the total polypropylene composition,
wherein the weight ratio of said semi-volatile organic condensables versus said volatiles is more than about 5.0,
wherein the polypropylene composition has an $MFR_2$ (ISO 1133, 230° C., 2.16 kg) of 8 g/10 min or higher,
wherein the polypropylene composition has a flexural modulus (ISO 178 measured on injection moulded specimens of 80×10×4 mm prepared in accordance with ISO 294-1:1996) of from 1200 to 5500 MPa, and
wherein the total quantity of slip agent is at least 500 ppm.
The following ranges are applicable for all embodiments according to the invention.

Properties of the Polypropylene Composition

The polypropylene compositions of the present invention are often used to produce moulded article for use in automobiles. Volatile organic compound emissions (VOC, VDA 278 October 2011) are often undesired; therefore, it is important to produce compositions, which have low levels of VOCs. Semi-volatile organic condensable (FOG, VDA 278 October 2011) emissions caused by longer chain oligomers in the polypropylene composition often condense on the windscreen, which can lead to the windscreen fogging up. Clearly, this is undesirable when driving. Fogging can be measured using the "Fogging gravimetric," method described in the experimental section below, a fogging gravimetric level that is as low as possible is desirable for automobile application.

The polypropylene compositions according to the current invention may have a FOG content of 350 µg/g or less, preferably 300 µg/g or less, more preferably 250 µg/g or less, more preferably 200 µg/g or less, most preferably 170 µg/g or less. In addition, the polypropylene compositions, which result from the inventive process may have a VOC content of 80 µg/g or less, or of 60 µg/g or less, preferably of 40 µg/g or less, most preferably of 20 µg/g or less.

Preferably, the polypropylene compositions according to the current invention have a ratio of FOG/VOC of 3 or more, preferably 5 or more, more preferably 10 or more.

The polypropylene compositions according to the current invention may have a VDA 277 of from 0 to 10 µgC/g, such as less than 10 µgC/g, preferably less than 5 µgC/g, more preferably less than 2 µgC/g, most preferably less than 1 µgC/g. In addition, the process may lead to polypropylene compositions with a fogging gravimetric of less than 1.2, preferably less than 1.1, most preferably less than 1.

In addition, the VDA 270 (Verband der Automobilindustrie) of the polypropylene compositions according to the current invention is minimised. VDA 270 is a measure of how unpleasant consumers find the odour of a particular polymer material. The polypropylene compositions according to the current invention have a VDA 270 of 4 or less, preferably 3 or less.

In a preferred aspect of the current invention, the polypropylene is relatively stiff having a flexural modulus of from 1200 to 5500 MPa, preferably about 1300 or 5000 MPa. In a preferred aspect, the polypropylene composition of the present invention could be used to produce injection-moulded articles, and in particular for moulded articles for automobile applications. For articles used in automobiles it is important that the polypropylene material is stiff, consequently a relatively high flexural modulus value is important.

The polypropylene composition of the present invention is also relatively resistant to being punctured by a point impact. This is important if the material is to be used to produce injection-moulded components, particularly for automobile applications. Recently, a significant emphasis has been placed on reducing the weight of polypropylene components in automobile applications. It is, therefore, important that these components are resistant to a point impact as otherwise they may be easily damaged or pierced by consumers during routine use of their automobiles.

Additionally, the polypropylene composition preferably has an $MFR_2$ (ISO 1133, 230° C., 2.16 kg) of from 5 to 200 g/10 min, preferably from 8 to 150 g/10 min, most preferably from 10 to 130 g/10 min. Polypropylene compositions having an $MFR_2$ of from 15 to 20 g/10 min are particularly preferred. A polypropylene composition with a reasonable $MFR_2$ i.e. greater than 10 g/10 min, is important for polypropylene compositions, as this means that they are able to flow relatively effectively and as such are suitable for uses in injection moulding.

Raw Components of the Polypropylene Composition

Prior to aeration of the polypropylene composition, the polypropylene composition according to the present invention preferably comprises the following raw components:

polypropylene
slip agent
filler
optional HDPE
optional plastomer
optional pigment In a preferred aspect, the polypropylene is present as a heterophasic polypropylene and a further polypropylene homo- and/or copolymer.

Polypropylene

Preferably, the total amount of polypropylene derived units in the polypropylene composition according to the present invention is at least 50 wt. %, more preferably at least 55 wt. %, most preferably at least 64 wt. %, and optionally up to a maximum of 90 wt. %.

The polypropylene compositions of the current invention preferably comprise at least a heterophasic polypropylene copolymer and a further polypropylene homo- and/or copolymer.

The polypropylene composition of the current invention preferably has:

a FOG content of below 350 g/g and
a VOC content of below 80 µg/g
and is obtainable by the process comprising the steps of a) polymerizing propylene and optionally other $C_4$-$C_{12}$ alpha olefins by solution polymerisation in at least one polymerization reaction to yield a raw polypropylene polymer, b) recovering said raw polymer from the at least one polymerisation reactor and feeding said raw polymer mixture to at least one flash vessel, thereby at least partially removing the solvent, unreacted monomer and unreacted co-monomer to yield a raw polymer, c) mixing the polymer with a range of other components, optionally including HDPE, fillers, carbon nanoparticles among others and subjecting the raw composition to mixing, preferably by an extruder or a static mixer, d) recovering the raw polypropylene composition having a VOC content of above 150 µg/g and a FOG content of above 350 µg/g e) subjecting said raw polypropylene composition in an aeration vessel to a gas stream with a Reynolds number of from 5 to 150 for an aeration time of from 3 to 96 hours, whereby the gas has a temperature of at least 100° C., f) recovering the polypropylene composition.

Heterophasic Polypropylene

There are essentially two different kinds of heterophasic polypropylene copolymers known in the art:

heterophasic copolymers comprising a polypropylene random copolymer (RAHECO) as the matrix phase, and heterophasic copolymers having a propylene homopolymers as the matrix phase (HECO)

In a preferred aspect of the present invention, the composition contains at least one preferably at least two different heterophasic polypropylene materials. Preferably, the composition contains at least one HECO, or at least two different HECOs or at least one HECO and one random heterophasic polypropylene (RAHECO).

The RAHECOs according to the present invention preferably have a $MFR_2$ (ISO 1133, 230° C., 2.16 kg) of from 1 to 100 g/10 min, preferably from 1 to 50 g/10 min, most preferably from 5 to 20 g/10 min, and/or a xylene solubles content (ISO 6427 at 23° C.) of from 10 to 50 wt.-%, preferably from, 20 to 40 wt.-%, most preferably from 25 to 35 wt.-%, and/or a total content of units derived from ethylene in an amount of 2 to 40 wt.-%, preferably from 5 to 25 wt.-% (determined by NMR).

The HECOs according to the present invention, preferably have an $MFR_2$ (ISO1133, 2.16 kg, 230° C.) of 5 to 150 g/10 min, preferably from 10 to 120 g/10 min and/or a xylene soluble (ISO16152) content of 8 to 30 wt.-% preferably from 10 to 25 wt.-% and/or a total content of units derived from ethylene in an amount of 4 to 20 wt.-% preferably from 6 to 15 wt.-% (determined by NMR).

A heterophasic propylene copolymers comprise polypropylene as a matrix and dispersed therein an elastomeric propylene copolymer. The polypropylene matrix, therefore, contains (finely) dispersed inclusions being not part of the matrix, said inclusions containing the elastomeric propylene copolymer. The term inclusion indicates that the matrix and the inclusion form different phases within the heterophasic propylene copolymer, said inclusions are for instance visible by high-resolution microscopy, like electron microscopy or scanning force microscopy.

The heterophasic propylene copolymer comprises apart from propylene also comonomers. Preferably, the heterophasic propylene copolymer comprises apart from propylene ethylene and/or $C_4$ to $C_{12}$ alpha-olefins. Accordingly, the term "propylene copolymer" according to this invention is understood as a polypropylene comprising, preferably consisting of, units derivable from (a) propylene
and
(b) ethylene and/or $C_4$ to $C_{12}$ alpha-olefins.

Heterophasic propylene copolymer materials may be produced by melt blending and/or by reactor blending. In this regard "reactor-blending" denotes that the individual fractions of the polymers are produced in subsequent stages, in the presence of the product of the previous stage. For example, the matrix and the disperse phase of a heterophasic polypropylene may be produced in such subsequent stages.

Furthermore, it is also possible to melt-blend a propylene already comprising two or more fractions, e.g. melt-blend a heterophasic propylene copolymer with a further propylene such as a propylene homopolymer or random copolymer.

Thus, the propylene copolymers according to this invention, i.e. the heterophasic propylene copolymer the elastomeric propylene copolymer, comprise monomers copolymerizable with propylene, for example co-monomers such as ethylene and/or $C_4$ to $C_{12}$ alpha-olefins. Preferably, the propylene copolymers according to this invention comprise monomers copolymerizable with propylene from the group consisting of ethylene, 1-butene and 1-hexene. More specifically the propylene copolymers of this invention comprise—apart from propylene—units derivable from ethylene and/or 1-butene. In a preferred embodiment, the propylene copolymers according to this invention comprise units derivable from ethylene and propylene only.

Accordingly, the elastomeric propylene copolymer (EC) is preferably an ethylene propylene rubber (EPR), whereas the polypropylene(s) of the matrix is/are either a random propylene copolymer or a propylene homopolymer.

In case one or more of the polypropylene(s) comprised in the matrix is a random propylene copolymer, it is appreciated that the random propylene copolymer(s) comprise(s)

monomers copolymerizable with propylene, for example co-monomers such as ethylene and/or $C_4$ to $C_{12}$ alpha-olefins, in particular ethylene and/or $C_4$ to $C_8$ alpha-olefins, e.g. 1-butene and/or 1-hexene. Preferably, the random propylene copolymer according to this invention comprises monomers copolymerizable with propylene from the group consisting of ethylene, 1-butene and 1-hexene. More specifically the random propylene copolymer of this invention comprises—apart from propylene—units derivable from ethylene and/or 1-butene. In a preferred embodiment, the random propylene copolymer comprises units derivable from ethylene.

The heterophasic polypropylene can be prepared by reactor-blending, melt-blending or a mixture thereof. These processes are known in the art.

The heterophasic polypropylene according to this invention is preferably produced in a multistage process known in the art, wherein the matrix is produced at least in one slurry reactor and subsequently the elastomeric copolymer is produced at least in one gas phase reactor.

Thus, the polymerization system can comprise one or more conventional stirred slurry reactors and/or one or more gas phase reactors. Preferably, the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably, the process comprises also a pre-polymerization with the chosen catalyst system, as described in detail below, comprising the Ziegler-Natta pro-catalyst, the external donor and the co-catalyst.

In a preferred aspect, the pre-polymerization is conducted as bulk slurry polymerization in liquid propylene, i.e. the liquid phase mainly comprises propylene, with minor amount of other reactants and optionally inert components dissolved therein.

The pre-polymerization reaction is typically conducted at a temperature of 0 to 50° C., preferably from 10 to 45° C., and more preferably from 15 to 40° C.

The pressure in the pre-polymerization reactor is not critical but must be sufficiently high to maintain the reaction mixture in liquid phase. Thus, the pressure may be from 20 to 100 bar, for example 30 to 70 bar.

The catalyst components are preferably all introduced in the pre-polymerization step. However, where the solid catalyst component (i) and the co-catalyst (ii) can be fed separately it is possible that only a part of the co-catalyst is introduced into the pre-polymerization stage and the remaining part into subsequent polymerization stages. Also in such cases, it is necessary to introduce so much co-catalyst into the pre-polymerization stage that a sufficient polymerization reaction is obtained therein.

It is possible to add other components also to the pre-polymerization stage. Thus, hydrogen may be added into the pre-polymerization stage to control the molecular weight of the pre-polymer as is known in the art. Further, antistatic additives may be used to prevent the particles from adhering to each other or to the walls of the reactor.

The precise control of the pre-polymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer.

According to a preferred embodiment the slurry reactor comprises a bulk loop reactor.

"Gas phase reactor" means any mechanically mixed or fluid bed reactor. Preferably, the gas phase reactor comprises a mechanically agitated fluid bed reactor with gas velocities of at least 0.2 m/sec.

The particularly preferred embodiment for the preparation of the heterophasic polypropylene of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315; which are incorporated herein by reference.

A further suitable slurry-gas phase process is the Spheripol® process of Basell.

Preferably the heterophasic polypropylene according to this invention are produced by using a special Ziegler-Natta pro-catalyst in combination with a special external donor, which is known to a person skilled in the art, preferably in the Spheripol® or in the Borstar®-PP process.

One preferred multistage process, may; therefore, comprise the steps of:

producing a polypropylene matrix in the presence of the chosen catalyst system, known to a person skilled in the art, comprising the special Ziegler-Natta pro-catalyst (i), an external donor (iii) and the co-catalyst (ii) in a first slurry reactor and optionally in a second slurry reactor, both slurry reactors using the same polymerization conditions, transferring the slurry reactor product into at least one first gas phase reactor, like one gas phase reactor or a first and a second gas phase reactor connected in series, producing an elastomeric copolymer in the presence of the polypropylene matrix and in the presence of the catalyst system in said at least first gas phase reactor, recovering the polymer product for further processing.

With respect to the above-mentioned preferred slurry-gas phase process, the following general information can be provided with respect to the process conditions.

Temperature is preferably from 40 to 110° C., preferably between 50 and 100° C., in particular between 60 and 90° C., with pressures in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature, preferably, is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

Polypropylene Homopolymer

In a preferred aspect of the present invention, the polypropylene composition comprises a RAHECO or HECO and a propylene homopolymer. The polypropylene homopolymer preferably has a melt flow rate $MFR_2$ (230° C., 2.16 kg) measured according to ISO 1133 of from 20 to 1000 g/10 min, preferably from 50 to 800 g/10 min, most preferably from 60 to 700 g/10 min.

The expression propylene homopolymer as used throughout the instant invention relates to a polypropylene that consists substantially, i.e. of equal or more than 99.9 wt.-%, of propylene units. In a preferred embodiment, only propylene units in the propylene homopolymer are detectable.

The propylene homopolymer can be multimodal or bimodal in view of the molecular weight, preferably the propylene homopolymer is bimodal.

Preferably, the propylene homopolymer is isotactic. Accordingly, it is appreciated that the propylene homopolymer has a rather high pentad concentration, i.e. higher than 80%, more preferably higher than 85%, yet more preferably higher than 90%, still more preferably higher than 92%, still yet more preferably higher than 93%, like higher than 95%.

Preferably, the propylene homopolymer has a density, measured according to ISO 1138, of at least 890 kg/m³, more preferably at least 900 kg/m³, still more preferably from 900 to 915 kg/m³.

The propylene homopolymer according to this invention can be produced in a slurry reactor and/or a gas phase reactor.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

In a preferred embodiment, the pre-polymerization is conducted as bulk slurry polymerization in liquid propylene, i.e. the liquid phase mainly comprises propylene, with minor amount of other reactants and optionally inert components dissolved therein.

The pre-polymerization reaction is typically conducted at a temperature of 0 to 50° C., preferably from 10 to 45° C., and more preferably from 15 to 40° C.

The pressure in the pre-polymerization reactor is not critical, but must be sufficiently high to maintain the reaction mixture in liquid phase. Thus, the pressure may be from 20 to 100 bar, for example 30 to 70 bar.

The catalyst components are preferably all introduced to the pre-polymerization step. However, where the solid catalyst component (i) and the co-catalyst (ii) can be fed separately, it is possible that only a part of the co-catalyst is introduced into the pre-polymerization stage and the remaining part into subsequent polymerization stages. Also in such cases, it is necessary to introduce so much co-catalyst into the pre-polymerization stage that a sufficient polymerization reaction is obtained therein.

It is possible to add other components also to the pre-polymerization stage. Thus, hydrogen may be added into the pre-polymerization stage to control the molecular weight of the pre-polymer as is known in the art. Further, antistatic additives may be used to prevent the particles from adhering to each other or to the walls of the reactor.

The precise control of the pre-polymerization conditions and reaction parameters is within the skill of a person skilled in the art.

A slurry reactor designates any reactor, such as a continuous or simple batch stirred tank reactor or loop reactor, operating in bulk or slurry and in which the polymer forms in particulate form.

A suitable catalyst system is described in EP 591 224.

Slip Agents

During polypropylene production, slip agents are often added to the polypropylene blend in order to reduce the coefficient of friction of these polypropylene materials. The most popular slip agents used by industry and which are used in a preferred aspect of the invention, are from the chemical group of fatty acid amides, such as e.g. erucamide. When a slip agent is mixed with a polypropylene polymer melt, it is absorbed into the amorphous regions of the polypropylene polymer.

On cooling the slip agent becomes incompatible with the polypropylene material, because of the different surface energies of the two materials and migrates to the material surface. The rate of migration depends on the difference between the surface energies of the polypropylene and the slip agent (the larger the difference, the faster the migration). This initially leads to the formation of a monolayer on the polymer surface, followed by the deposition of subsequent layers when new molecules of the slip agent arrive on the surface leading to the formation of a double layer. Because of weak bonding between the layers of fatty acid amides, materials produced from polypropylene containing fatty acid amides will slide over each other with ease. The presence of a layer of slip agent also reduces the friction at the surface of the polypropylene composition. This property is also important, for example, when producing injection-moulded articles, as slip agents can be used to help aid the release of injection-moulded articles from a mould. Fatty acid amides come to the surface of polypropylene articles, when the polypropylene cools; therefore, reducing the coefficient of friction between the polypropylene article and the mould. This means that with relatively little force the polypropylene article can be removed from the mould and that no polypropylene sticks to the mould on release of the moulded article. Many slip agents in particular fatty acid amides, such as e.g. erucamide are relatively volatile and, therefore, care is required to prevent these materials escaping during processing steps in polymer production.

The polypropylene composition according to the present invention retains high levels of slip agent, despite its process history. Slip agents are preferably added before the aeration step. as this leads to a more even distribution of slip agent throughout the material; whereas, if slip agents are added after aeration, they may not smoothly coat the polypropylene articles produced from injection moulding, meaning that these articles do not slip easily out of the mould. In addition, compounds such as erucamide have a dual purpose in that they are also responsible for the scratch resistance properties of the polypropylene composition. In order to obtain good scratch resistance it is also important that these compounds are evenly distributed throughout the composition.

Fillers

The polypropylene composition according to the present invention may also comprise fillers in amounts of up to '40 wt.-%, preferably up to 30 wt.-%, based on the total amount of the polypropylene composition. Usually the filler is present in an amount of 1.0 wt. % or more, more preferable 5.0 wt. % or more and most preferably 7.0 wt. % or more, based on the total amount of the polypropylene composition.

The filler may be selected from the group of glass fibers, talc, carbon fibers, phyllosilicate, mica, wollastonite or mixtures thereof. Preferably, the filler is selected from the group of glass fibers and talc. The most preferred fillers are talc or glass fibres.

HDPE

High density polyethylene (HDPE) is well known in the art and defines a polyethylene which is substantially unbranched, i.e. is of linear structure.

Preferably, the high density polyethylene (HDPE) has a density of at least 930 kg/m$^3$, more preferably of at least 940 kg/m$^3$, yet more preferably in the range of 930 to 975 kg/m$^3$, still yet more preferably in the range of 940 to 968 kg/m$^3$, like 950 to 965 kg/m$^3$.

Preferably, the high density polyethylene (HDPE) has a rather low melt flow rate. Accordingly in a preferred embodiment the high density polyethylene (HDPE) has a melt flow rate MFR$_2$ (190° C./2.16 kg) of not more than 10.0, more preferably of not more than 5.0 g/10 min, still more preferably in the range of 0.01 to 10.0 g/10 min, like in the range of 0.1 to 5.0 g/10 min.

Plastomer

In the context of the present invention, the plastomer used is preferably an ethylene copolymer. Suitable ethylene copolymers can be any copolymer of ethylene and an alpha olefin having from 6 to 12 carbon atoms, said alpha olefin having the above defined properties. Preferably, the ethylene copolymer is selected from ethylene based plastomers. Suitable ethylene based plastomers are commercially available, i.e. from Borealis under the tradename Queo.

Preferably, the plastomer has a density in the range of 860 to 930 kg/m$^3$ more preferably in the range of 865 to 920 kg/m$^3$, like in the range of 868 to 910 kg/m$^3$. further preferably, the plastomer has a melt flow rate MFR (190° C./2.16 kg) in the range of 0.1 to 40.0 g/10 min, more preferably in the range of 0.3 to 35 g/10 min, like from 0.4 to 32 g/10 min.

In a preferred aspect of the present invention, the plastomer is an ethylene-octene plastomer.

Said ethylene based plastomers can be prepared by known processes, such as one stage or two stage polymerization processes, comprising solution polymerization, slurry polymerization, gas phase polymerization or combinations thereof, in the presence of suitable catalysts, like vanadium oxide catalysts or single-site catalysts, e.g. metallocene or constrained geometry catalysts, known to art skilled persons.

Preferably, these ethylene based plastomers are prepared by a one stage or two stage solution polymerization process, especially by a high temperature solution polymerization process at temperatures higher than 100° C., in the presence of a single site catalyst.

Such a process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably, the solution polymerization process is a high temperature solution polymerization process, using a polymerization temperature of higher than 100° C. Preferably, the polymerization temperature is at least 110° C., more preferably at least 150° C. The polymerization temperature can be up to 250° C.

The pressure in such a solution polymerization process is preferably in the range of to 100 bar, preferably 15 to 100 bar and more preferably 20 to 100 bar.

The liquid hydrocarbon solvent used is preferably a hydrocarbon having from 5 to 12 carbon atoms, which may be unsubstituted or substituted by alkyl groups having from 1 to 4 carbon atoms such as pentane, methyl pentane, hexane, heptane, octane, cyclohexane, methylcyclohexane and hydrogenated naphtha. More preferably, unsubstituted hydrocarbon solvents having from 6 to 10 carbon atoms are used.

Suitably, the ethylene copolymer comprises from 10 wt % to 50 wt % of linear alpha olefin comonomer units having from 6 to 12 carbon atoms, preferably from 20 wt % to 45 wt % of linear alpha olefin comonomer units having from 6 to 12 carbon atoms, and most preferably from 30 wt % to 40 wt % of linear alpha olefin comonomer units having from 6 to 12 carbon atoms.

The linear alpha olefin comonomer units are preferably selected from 1-octene and/or 1-hexene, most preferably the linear alpha olefin comonomer units are 1-octene. Preferably, copolymers of ethylene and 1-octene are used in the composition of the present invention.

Pigment

Optionally the polypropylene composition comprises a pigment. Suitable pigments are known in the art.

Preferably, a black pigment is used, such as e.g. carbon black, such as Black Pearls® from Cabot Corporation.

The total amount of pigments present in the polypropylene composition according to the present invention is preferably 0.10 to 15.0 wt. %, more preferably 0.5 to 10.0 wt. % and most preferably from 0.5 to 8 wt. % based on the total weight of the polypropylene composition.

Additives

The polypropylene composition may also comprise further additives. These can help with processing of the polypropylene composition, or help to improve the final properties of the composition, such as $MFR_2$. The polypropylene composition according to the present invention may comprise additives selected from the group of antioxidants, processing aids, acid scavengers (such as e.g. calcium stearate, lubricants).

The total amount of additives is preferably within the range of 0.05 to 5.0 wt. %, more preferably 0.10 to 3.5 wt. % and most preferably from 0.25 to 2.5 wt. %.

Production Process for the Polypropylene Composition

As mentioned above, the present invention is concerned with a polypropylene composition obtainable by blending polypropylene filler slip agent(s)

optional HDPE optional plastomer optional pigment in the presence of additives to obtain a blend, and further subjecting the blend to a process comprising the steps of, a) providing an aeration vessel having at least one inlet for aeration gas, at least one outlet for exhaust gas, an inlet for the raw polypropylene composition at the top of the aeration vessel, an outlet for the polypropylene composition at the bottom of the aeration vessel, wherein the polypropylene composition is present as a packed bed.

b) initiating a counter-current flow of the polypropylene composition and aeration gas c) by feeding the raw polypropylene composition having a volatile organic compound content (VOC, VDA 278 October 2011) of greater than about 150 μg/g and a semi-volatile organic condensable content of greater than about 350 μg/g (FOG, VDA 278 October 2011), into said aeration vessel from the top, feeding the aeration gas into said aeration vessel via the at least one inlet at the bottom;

withdrawing the exhaust gas via the outlet for exhaust gas;

withdrawing the aerated polypropylene composition via the outlet at the bottom of the aeration vessel d) maintaining said aeration gas flow for an aeration time of from 3 to 96 hours, wherein, the temperature of the gas is from 100° C. to 140° C., and wherein, the Reynolds number of the gas flow is from 5 to 150.

The process described above is preferably operated for less than about 24 hours, or less than about 12 hours, or less than about 10 hours, such as from 3 to 9 hours. Generally, the aeration time is inversely proportional to the gas temperature meaning that a compromise must be reached to avoid the pellets melting and sticking together. Typical values for the temperature and residence time for polypropylene according to EP2005/056962 are from 80 to 110° C. for a period of from 10 to 50 hours. It is believed that the reduction in VOCs reaches a plateau following extended aeration times of greater than five hours in the conditions described here; in contrast, for FOGs there is a weaker dependence on aeration time in the period from 0 to 5 hours. It is believed that this is due to slow diffusion of higher molecular weight alkanes ($C_{16}$-$C_{32}$) which are responsible for FOG emissions, in contrast to the rapid diffusion of <$C_{20}$ which are responsible for VOC emission.

Generally, the polypropylene composition is preferably not mixed or moved throughout the treatment by mechanical means. Consequently, during the aeration process the polypropylene composition is effectively stationary (apart from its vertical transit through the aeration vessel). Therefore, the present invention preferably excludes processes where the polymer composition is agitated during aeration.

Preferably, the aeration process is carried out on polypropylene pellets. In addition, the process is generally carried out in an isolated treatment vessel, preferentially an isolated silo. The silo may for example be a steel silo.

The polypropylene compositions obtained by the process described above have a particular structure, meaning that they are display $MRF_2$ values suitable for injection moulding, relatively high puncture energy values, high scratch resistance and high stiffness among other properties.

BRIEF DESCRIPTION OF THE DRAWINGS

FIG. 1: Ratio FOG/VOCs based on VDA 278 October 2011 before vs. after the aeration process.

EXPERIMENTAL PART

The following Examples are included to demonstrate certain aspects and embodiments of the invention as described in the claims. It should be appreciated by those of skill in the art, however, that the following description is illustrative only and should not be taken in any way as a restriction of the invention.

Test Methods

Sample Preparation

VOC values, FOG values and TVOC values were measured as described below, after sample preparation consisting of injection moulding plaques in the acc. EN ISO 19069-2:2016. These plaques were packed in aluminium-composite foils immediately after production and the foils were sealed.

For the thermodesorption analysis according to VDA 278 (October 2011) the samples were stored uncovered at room temperature (23° C. max.) for 7 days directly before the commencement of the analysis.

Regarding the VDA 277 (January 1995) measurements, no additional uncovered storage or other conditioning took place. Instead, the injection moulded plaques were cut and ground in a Retsch SM-2000 mill.

In both cases (VDA 277 and VDA 278), the production date of the injection moulded plaques, the time when the sample arrived in the lab as well as the analysis date were recorded.

VOC and FOC acc VDA278

VOC:

is determined according to VDA 278 October 2011 from injection moulded plaques. VDA 278 October 2011, Thermal Desorption Analysis of Organic Emissions for the Characterization of Non-Metallic Materials for Automobiles, VDA Verband der Automobilindustrie. According to the VDA 278 October 2011 the VOC value is defined as "the total of the readily volatile to medium volatile substances. It is calculated as toluene equivalent. The method described in this Recommendation allows substances in the boiling/elution range up to n-Pentacosane ($C_{25}$) to be determined and analyzed."

FOG:

is determined according to VDA 278 October 2011 from injection moulded plaques. According to the VDA 278 October 2011 the FOG value is defined as "the total of substances with low volatility which elute from the retention time of n-Tetradecane (inclusive). It is calculated as hexadecane equivalent. Substances in the boiling range of n-Alkanes "014" to "032" are determined and analyzed."

Total Emission, TVOC:

The total emission of the polypropylene composition was determined by VDA 277 January 1995 from pellets.

Fogging:

Fogging was measured according to DIN 75201:2011-11, method B (gravimetric method) on compression-moulded specimens (diameter 80 mm+/−1 mm, thickness<1 cm) cut out from an injection-moulded plate. With this method the mass of fogging condensate on aluminium foil in mg by means weighing of foil before and after the fogging test is determined. The term "fogging" refers to a fraction of volatile substances condensed on glass parts as e.g. the windscreen of a vehicle.

Diameter D:

A sieve analysis according to ISO 3310 was performed. The sieve analysis involved a nested column of sieves with wire mesh screen with the following sizes: >20 µm, >32 µm, >63 µm, >100 µm, >125 µm, >160 µm, >200 µm, >250 µm, >315 µm, >400 µm, >500 µm, >710 µm, >1 mm, >1.4 mm, >2 mm, >2.8 mm, >4 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve. The particle size distribution and the characteristic median particle size d50 was determined from the results of the sieve analysis according to ISO 9276-2.

Melt Flow Rate (MFR 2):

The melt flow rates were measured with a load of 2.16 kg ($MFR_2$) at 230° C. The melt flow rate is the quantity of polymer in grams which the test apparatus standardized to ISO 1133 extrudes within 10 minutes at a temperature of 230° C. under a load of 2.16 kg.

Xylene Cold Soluble Fraction (XCS Wt %):

The xylene cold soluble fraction (XCS) is determined at 23° C. according to ISO 6427.

NMR-Spectroscopy Measurements:

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}O\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol \%]=100*fE$$

The weight percent comonomer incorporation was calculated from the mole fraction:

$$E[wt \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Polymer—Puncture Plaque—Instrumented:

Puncture energy is determined in the instrumented falling weight test according to ISO 6603-2 using injection moulded plaques of 60×60×1 mm and a test speed of 2.2 m/s, clamped, lubricated striker with 20 mm diameter. The reported puncture energy results from an integral of the failure energy curve measured at (60×60×1 mm).

Flexural Modulus:

The flexural modulus was determined in 3-point-bending according to ISO 178 on injection molded specimens of 80×10×4 mm prepared in accordance with ISO 294-1:1996.

VDA 270:

VDA 270 is a determination of the odour characteristics of trim-materials in motor vehicles. VDA 270 was determined according to the standards used by the "Verband der Deutsche industrie," 1992. In general, the material is warmed in a sealed vessel (with or without de-ionised water) for a period of time. The vessels are then removed from the warmed environment and at least 3 human subjects then rate the odour of a particular polymeric material on a scale of 1 to 6, according to the categories described below:

1: imperceptible

2: noticeable, not disturbing

3: clearly noticeable, but not yet disturbing

4: disturbing

5: strongly disturbing

6: unbearable

Experiments

TABLE 1

| Properties of the base resins used in the compositions used in Example 1. | | | | |
|---|---|---|---|---|
| Base resin | Type | MFR$_2$ (g/10 min) | XS (wt-%) | C2 (ethylene content) (wt-%)[2] |
| Resin 1 | Heterophasic polypropylene copolymer (HECO) | 100 | 13 | 6.5 |
| Resin 2 | RTPO[1] (RAHECO) | 5.5 | 25 | 6.5 |
| Resin 3 | RTPO[1] (RAHECO) | 18 | 31 | 20 |
| Resin 4 | Homopolymer (polypropylene) | 75 | — | — |
| Resin 5 | Heterophasic polypropylene copolymer (HECO) | 20 | 18 | 8 |

[1]Random thermoplastic olefin
[2]Determined by $^{13}$C-NMR spectroscopy

TABLE 2

| The composition of each of the polypropylene compositions used in Example 1 | | | | | | |
|---|---|---|---|---|---|---|
| | | A | B | C | D | E |
| Base resin | Resin 1 | 46 | 29.5 | — | — | 32.0 |
| | Resin 2 | 21 | 15 | 10 | — | 15 |
| | Resin 3 | — | 19.5 | 40.5 | 28 | 4.4 |
| | Resin 4 | — | — | — | 48.5 | — |
| | Resin 5 | — | — | 25.0 | — | — |
| | HDPE | 6 | 8 | 8 | — | 10 |
| | Elastomer[1] | 7 | 4 | — | — | 11 |
| Filler | Talc filler | 10 | 17 | 7 | — | 20.5 |
| | Glass filler | — | — | — | 20 | — |
| | Carbon black/ other carbon | 7.5 | 4.5 | 6 | 0.5 | 3 |
| | Total | 97.5 | 97.5 | 96.5 | 97 | 96 |
| Slip agent | | | | | | |
| Properties[2] | | | | | | |
| | Tm (° C.) | 165 | 166 | 166 | 165 | 165 |
| | MFR (g/10 min) | 20 | 17 | 13 | 12 | 14 |
| | Puncture energy 23° C., 4.4 m/s, 3 mm (J) | 42 | 39 | 39 | 6 | 38 |
| | Flexural modulus (MPa) | 1700 | 1800 | 1400 | 4200 | 1900 |

Values are given in weight percent and rounded to the nearest 0.5%.
[1]An ethylene-propylene elastomer.
[2]Properties of the raw polypropylene compositions before aeration.

Example 1 (Ex1)

Batches of pelletized polypropylene compositions, corresponding to the materials A, B, C, D and E as defined in Table 2 respectively, were subjected to aeration. Aeration was carried out in an insulated cylindrically shaped silo with dimensions of 1.5 m$^3$.

The pellets had a median particle size d$_{50}$ of 3.5 mm (ISO 3310, evaluation according to ISO 9276-2). The pellets were at room temperature (ca. 25° C.) before being subject to aeration i.e. a pre-heating step was not applied.

The aeration process was carried out for 7.5 hours at a temperature of 140° C. A gas flow rate of 260 m 3/h was used. The pellets were not mixed or agitated during the process and instead simply moved vertically through the silo at a speed of 100 kg/hour.

The process was carried out on a 1000 kg scale. In a cylindrical silo of 1.5 m³. A relative flow rate of polypro- D: d50 diameter (m) of the particles (using sieve analysis according to ISO3310 and evaluation according to ISO9276-2)

The Reynolds number for the gas flow used in the process of example 1 was 20.

TABLE 4

VOC, FOG, VDA 277, Fogging gravimetric, VDA 270 and
ratio of FOG/VOC for polymers A, B, C, D and E.

| Polymer | | VDA278, VOC* | VDA278, FOG* | VDA277 | Fogging gravimetric | VDA 270 - Odour 5 pax, median | FOG/VOC |
|---|---|---|---|---|---|---|---|
| A | Before aeration | 232 | 460 | 45 | 1.28 | 3 | 2 |
| | After aeration | 12 | 161 | 1 | 0.52 | | 13 |
| B | Before aeration | 188 | 400 | 41 | 1.26 | 4 | 2 |
| | After aeration | 16 | 235 | 0 | 1.08 | 4 | 15 |
| C | Before aeration | 245 | 464 | 45 | 0.85 | | 2 |
| | After aeration | 14 | 150 | 0 | 0.32 | | 11 |
| D | Before aeration | 246 | 467 | 31 | 1.06 | 3 | 2 |
| | After aeration | 5 | 114 | 0 | 0.45 | 3 | 23 |
| E | Before aeration | 190 | 326 | 35 | 0.77 | 5 | 2 |
| | After aeration | 15 | 149 | 3 | 0.33 | | 10 |

VOC and FOG values were measured after 7 days according to VDA 278, VDA277 and fogging gravimetric were measured immediately pylene composition pellets of 100 kg/hr was maintained throughout the aeration process.

The aeration process was carried out continuously for 7 hours.

The VOC, FOG, VDA 277 and Fogging gravimetric obtained for each grade before and after the aeration step is given in Table 4.

TABLE 3

Summary of the airflow characteristics
used in the present experiments

| | Units | Value in the current experiments |
|---|---|---|
| density of the fluid (gas)/ | kg/m³ | 0.85 |
| kinematic viscosity of the fluid (gas)/μ | kg/m s | $2.35 \times 10^{-5}$ |
| superficial velocity/$v_s$ | m/s | 0.16 |
| Diameter of the particles (method as described above) | m | 0.0035 |

The Reynolds number can be calculated using the formula:

$$Re = (\rho v_s D)/\mu$$

where:

: density of the aeration gas at the temperature used (kg/m³)

μ: kinematic viscosity of the aeration gas at the temperature used (kg/m s)

$v_s$: superficial velocity, defined as Q/A where Q is the volume flow rate of the aeration gas, (m³/s) and A is the cross sectional area (m²)

Surprisingly, the total quantity of slip agent after aeration was above 500 ppm for all polymers A to E.

TABLE 5

Properties of polypropylene compositions
A, B and C following aeration

| Polymer | Melting point, Tm (° C.) | Puncture energy 23° C., 4.4 m/s, 3 mm (J) | Percentage change in puncture energy before and after aeration (%) |
|---|---|---|---|
| A | 165 | 42 | 0 |
| B | 166 | 40 | 2.5 |
| C | 166 | 39 | 0 |
| D | 166 | 6 | 0 |
| E | 165 | 39 | 3 |

The invention claimed is:

1. A process for providing a polypropylene composition comprising:

semi-volatile organic condensable oligomers FOG in an amount of 50 μg/g to 400 μg/g of the total polypropylene composition determined according to VDA 278 October 2011, and volatile organic compounds VOC in an amount of less than 80 μg/g of the total polypropylene composition determined according to VDA 278 October 2011, wherein the weight ratio of said semi-volatile organic condensable oligomers versus said volatile organic compounds is more than 5.0, wherein the polypropylene composition has an MFR$_2$ of 10 g/10 min or higher determined according to ISO 1133 at 230° C. and a load of 2.16 kg, wherein the polypropylene composition has a flexural modulus, determined according to ISO 178 on injection molded specimens of 80×10×4 mm prepared in accordance with ISO 294-1:1996, of from 1000 to 6000 MPa, and wherein the total quantity of slip agent is at least 500 ppm, the process comprising:

blending polypropylene, filler, slip agent, optional HDPE, optional plastomer, and optional pigment in the presence of additives providing to obtain a blend, and further subjecting the blend to a process comprising the steps of:

a) providing an aeration vessel having, at least one inlet for aeration gas, at least one outlet for exhaust gas, an inlet for a raw polypropylene composition at the top of the aeration vessel, an outlet for the polypropylene composition at the bottom of the aeration vessel, wherein the polypropylene composition is present as a packed bed;

b) initiating a counter-current flow of the polypropylene composition and aeration gas, c) by feeding the raw polypropylene composition having a volatile organic compound content VOC of greater than 150 µg/g determined according to VDA 278 October 2011; and a semi-volatile organic condensable content FOG of greater than 350 µg/g determined according to VDA 278 October 2011, into said aeration vessel from the top, feeding the aeration gas into said aeration vessel via the at least one inlet at the bottom;

withdrawing the exhaust gas via the outlet for exhaust gas;

withdrawing the aerated polypropylene composition via the outlet at the bottom of the aeration vessel, d) maintaining said aeration gas flow for an aeration time of from 3 to 96 hours, wherein the temperature of the gas is from 100° C. to 140° C., and wherein, the Reynolds number of the gas flow is from 5 to 150, whereby the Reynolds number for the flow of aeration gas through the packed bed is defined by formula (I)

$$Re = (\rho v_s D)/\mu \qquad (I)$$

where:

$\rho$ is the density of the aeration gas at the temperature used in $kg/m^3$, $\mu$ is the kinematic viscosity of the aeration gas at the temperature used in kg/m s, $v_s$ is the superficial velocity, defined as Q/A where Q is the volume flow rate of the aeration gas in $m^3/s$ and A is the cross sectional area in $m^2$, D is the diameter in m of the particles; and wherein no further slip agent is added to the composition after step d), the aeration step.

2. The process according to claim 1, wherein the slip agent is a fatty acid amide.

3. The process according to claim 2, wherein the fatty acid amide is erucamide or oleamide.

4. The process according to claim 1, wherein the odor rating according to VDA 277 is less than 1.

5. The process according to claim 1, wherein the fogging gravimetric is less than 1.1, and/or wherein the total emissions according to VDA 270 are 3 µg carbon per g sample or less.

6. The process according to claim 1, wherein the polypropylene composition has an $MFR_2$ of from 10 to 25 g/10 min determined according to ISO 1133 at 230° C. and a load of 2.16 kg.

7. The process according to claim 1, wherein the polypropylene composition has a flexural modulus, determined according to ISO 178 on injection molded specimens of 80×10×4 mm prepared in accordance with ISO 294-1:1996, of from 1300 to 5000 MPa.

8. The process according to claim 1, wherein the blending step involves blending a heterophasic polypropylene with a further polypropylene homo- and/or copolymer.

9. The process according to claim 1, wherein the polypropylene composition has a flexural modulus, determined according to ISO 178 on injection molded specimens of 80×10×4 mm prepared in accordance with ISO 294-1:1996, of from 1200 to 5500 MPa.

10. The process according to claim 1, wherein the polypropylene composition has a puncture energy of from 20 to 60 J.

11. The process according to claim 1, wherein the filler is selected from the group consisting of talc, glass, and mixtures thereof.

* * * * *